United States Patent
Kubota et al.

(10) Patent No.: US 11,204,420 B2
(45) Date of Patent: Dec. 21, 2021

(54) DISTANCE MEASUREMENT APPARATUS

(71) Applicants: Kabushiki Kaisha Toshiba, Minato-ku (JP); Toshiba Electronic Devices & Storage Corporation, Minato-ku (JP)

(72) Inventors: Hiroshi Kubota, Fussa (JP); Nobu Matsumoto, Ebina (JP); Saki Sato, Kawasaki (JP); Tomonori Fukushima, Kawasaki (JP)

(73) Assignees: Kabushiki Kaisha Toshiba, Minato-ku (JP); Toshiba Electronic Devices & Storage Corporation, Minato-ku (JP)

( * ) Notice: Subject to any disclaimer, the term of this patent is extended or adjusted under 35 U.S.C. 154(b) by 408 days.

(21) Appl. No.: 15/911,312

(22) Filed: Mar. 5, 2018

(65) Prior Publication Data

US 2019/0086541 A1 Mar. 21, 2019

(30) Foreign Application Priority Data

Sep. 19, 2017 (JP) .............................. JP2017-179411

(51) Int. Cl.
| | |
|---|---|
| *G01S 17/10* | (2020.01) |
| *G01S 7/487* | (2006.01) |
| *G01S 7/4865* | (2020.01) |
| *G01S 7/484* | (2006.01) |
| *G01S 7/4861* | (2020.01) |

(52) U.S. Cl.
CPC .............. *G01S 17/10* (2013.01); *G01S 7/484* (2013.01); *G01S 7/487* (2013.01); *G01S 7/4865* (2013.01); *G01S 7/4861* (2013.01)

(58) Field of Classification Search
CPC ........ G01S 7/484; G01S 17/10; G01S 7/4863; G01S 7/4865; G01S 7/487; G01S 17/42; G01S 7/4861

See application file for complete search history.

(56) References Cited

U.S. PATENT DOCUMENTS

| | | |
|---|---|---|
| 5,715,045 A | 2/1998 | Dunne |
| 2002/0176067 A1* | 11/2002 | Charbon ................ H04N 5/363 356/4.01 |

(Continued)

FOREIGN PATENT DOCUMENTS

| | | |
|---|---|---|
| DE | 10 2007 046 562 A1 | 4/2009 |
| EP | 1 972 961 A2 | 9/2008 |

(Continued)

*Primary Examiner* — Luke D Ratcliffe

(74) *Attorney, Agent, or Firm* — Oblon, McClelland, Maier & Neustadt, L.L.P.

(57) ABSTRACT

According to one embodiment, a distance measurement apparatus includes a light emitter that intermittently emits a light beam, and a meter that measures a distance to an object from a length of time from an emission of the light beam from the light emitter to a return of reflected light by the object. The light emitter emits the light beam in a certain cycle with delay corresponding to randomly set offset time. The meter generates an integrated detection signal by shifting a plurality of detection signals of the light beam emitted in the certain cycle by the respective offset times and time-divisionally integrating the detection signals, and determines based on the integrated detection signal whether or not the light indicated by the detection signals is reflected light by the object, emitted from the light emitter.

4 Claims, 11 Drawing Sheets

(56) References Cited

U.S. PATENT DOCUMENTS

| | | | |
|---|---|---|---|
| 2010/0045965 A1* | 2/2010 | Meneely | G01S 17/10 356/5.01 |
| 2016/0003946 A1* | 1/2016 | Gilliland | G01S 7/4863 356/5.01 |
| 2017/0082746 A1 | 3/2017 | Kubota et al. | |
| 2017/0184709 A1 | 6/2017 | Kienzler et al. | |
| 2017/0363740 A1 | 12/2017 | Kubota et al. | |

FOREIGN PATENT DOCUMENTS

| | | |
|---|---|---|
| EP | 2 157 445 A2 | 2/2010 |
| EP | 3 185 038 A1 | 6/2017 |
| JP | 61-149879 A | 7/1986 |
| JP | 11-23713 A | 1/1999 |
| JP | 2000-065497 | 3/2000 |
| JP | 2004-157044 A | 6/2004 |
| JP | 2013-160769 A | 8/2013 |
| WO | WO 97/043651 A1 | 11/1997 |

\* cited by examiner

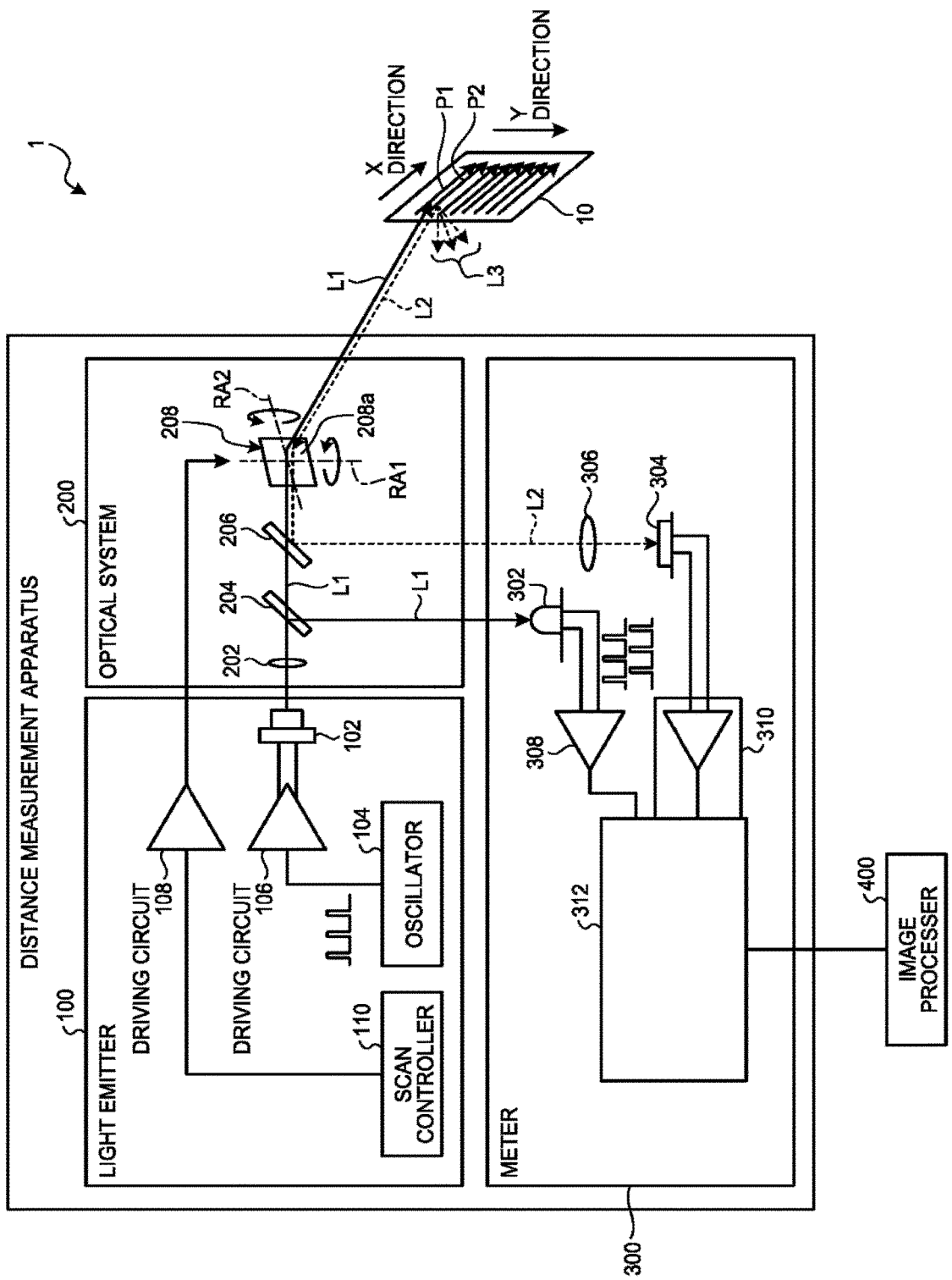

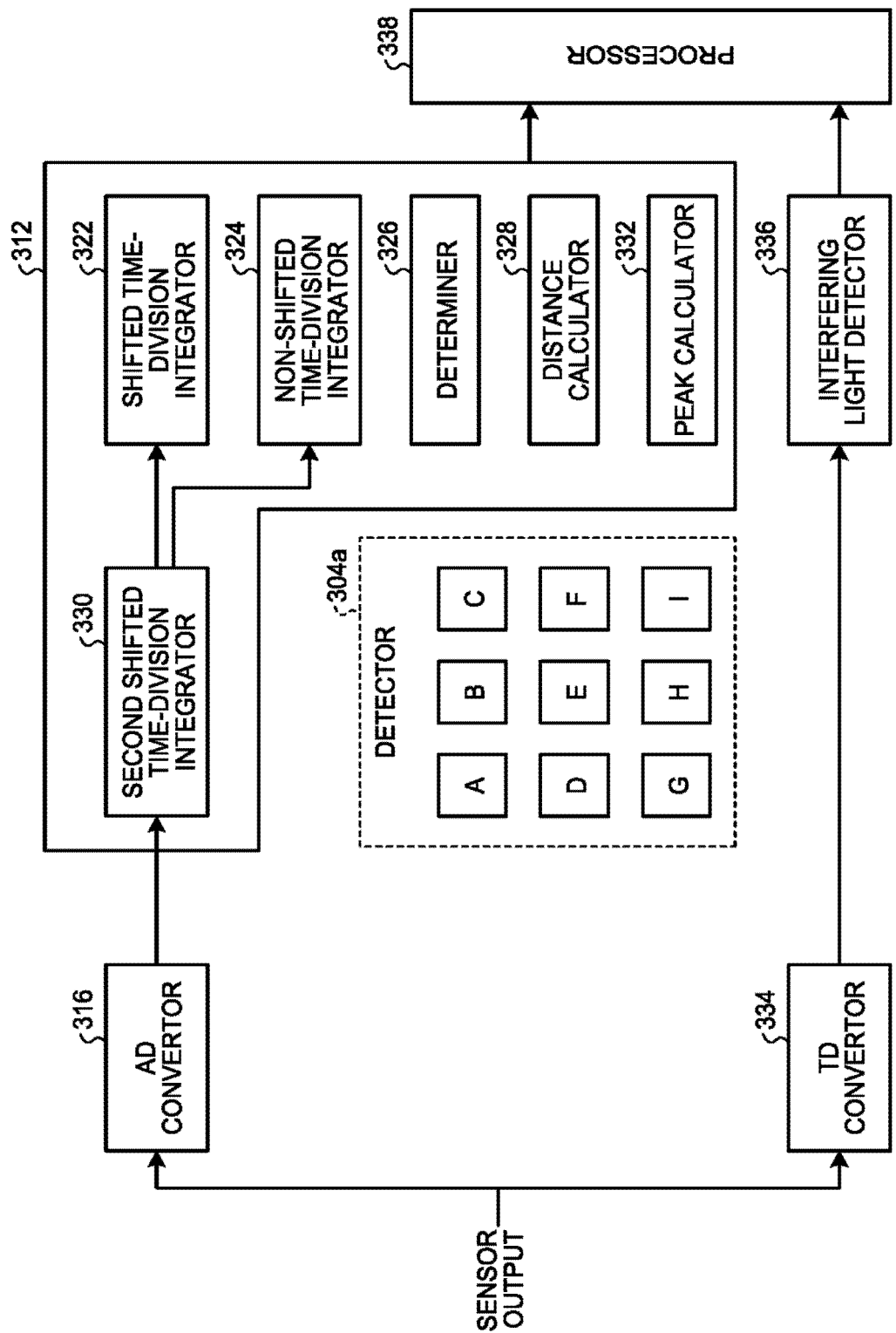

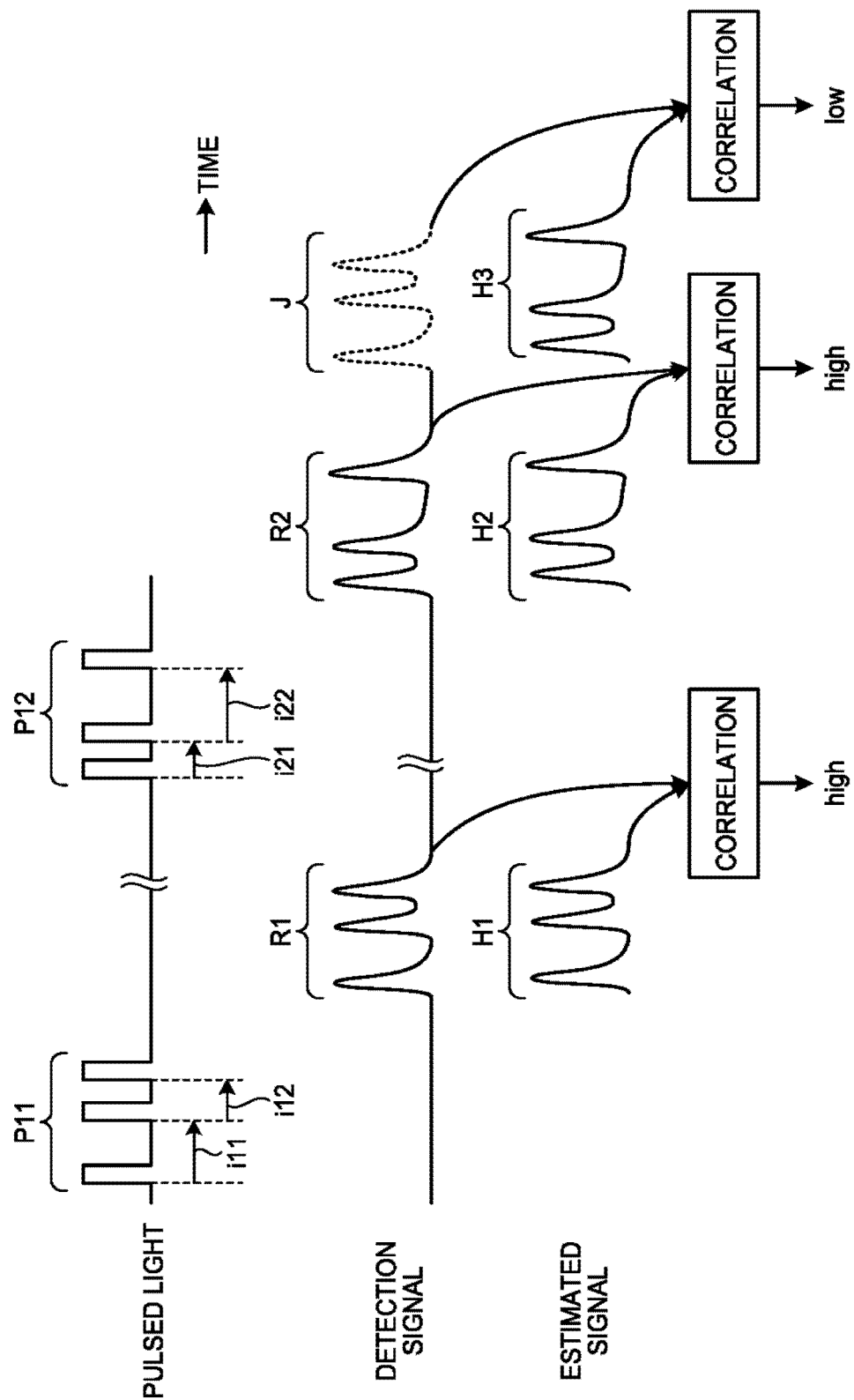

DISTANCE MEASUREMENT APPARATUS

CROSS-REFERENCE TO RELATED APPLICATIONS

This application is based upon and claims the benefit priority from Japanese Patent Application No. 2017-179411, filed Sep. 19, 2017, the entire contents of which are incorporated herein by reference.

FIELD

Embodiments of the present invention relate generally to a distance measurement apparatus.

BACKGROUND

Distance measuring apparatuses called a laser imaging detection and ranging (LIDAR) are known. Such a distance measurement apparatus irradiates an object with pulsed light from a light source and detects reflected light (scattered light) by the object with a photodetector. In this case, the longer the distance (optical path length) from the distance measurement apparatus to the object is, the longer the optical reciprocating time is. Thus, the apparatus can measure distance from a difference in timing between the light emission from the light source and the detection of the reflected light.

The distance measurement apparatus described above may incorrectly measure a distance while emitting the pulsed light in a certain cycle, for example, when detecting interfering light emitted in the same cycle by a malicious third party.

The present embodiment aims to provide a distance measurement apparatus capable of accurately determining whether detected light is normally reflected light or interfering light.

BRIEF DESCRIPTION OF THE DRAWINGS

FIG. 2 is an overall configuration diagram of the distance measurement apparatus according to the first embodiment;

FIG. 7 is a schematic overall configuration diagram of a distance measurement apparatus according to a fourth embodiment;

FIG. 8 is an explanatory diagram of light emission timing in a fifth embodiment;

DETAILED DESCRIPTION

The distance measurement apparatus according to an embodiment includes a light emitter that intermittently emits a light beam and a meter that measures a distance to an object from a length of time from an emission of the light beam from the light emitter to a return of reflected light by the object. The light emitter emits the light beam in a certain cycle with delay corresponding to a randomly set offset time. The meter generates an integrated detection signal by shifting a plurality of detection signals of the light beam emitted in the certain cycle with the respective offset times and time-divisionally integrating the detection signals, and determines based on the integrated detection signal whether or not the light indicated by the detection signals is reflected light by the object, emitted from the light emitter.

Hereinafter, a distance measurement apparatus according to embodiments will be described with reference to the attached drawings. The present invention is not limited by the embodiments. First, for better understanding, a comparative example will be described.

Comparative Example

Figure 9A:
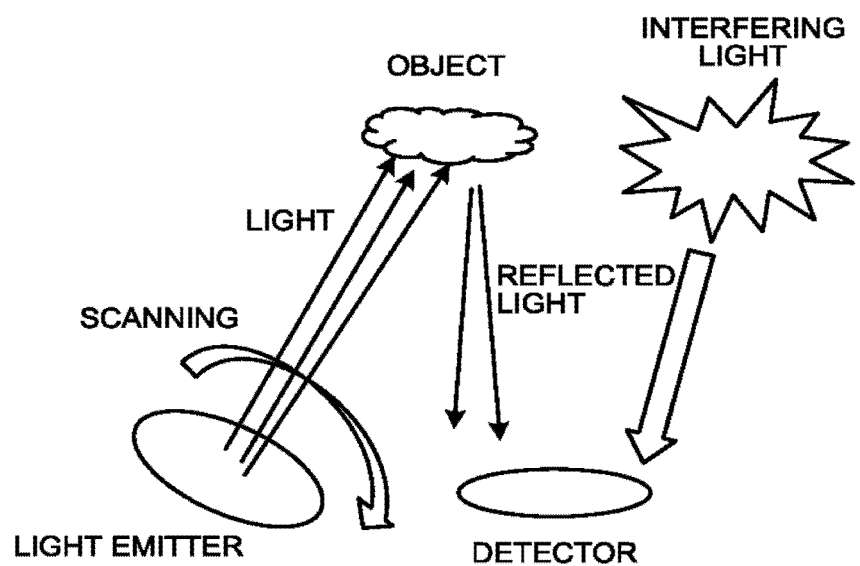
FIG. 9A is an explanatory diagram of overall operations of a distance measurement apparatus according to Comparative Example.

FIG. 9A is an explanatory diagram of the overall operation of a distance measurement apparatus according to a comparative example. In this distance measurement apparatus, the light emitter intermittently emits the light beam to an object for scanning. A detector detects reflected light by the object. The detector also detects interfering light emitted from a laser generator by a malicious third party.

Figure 9B:
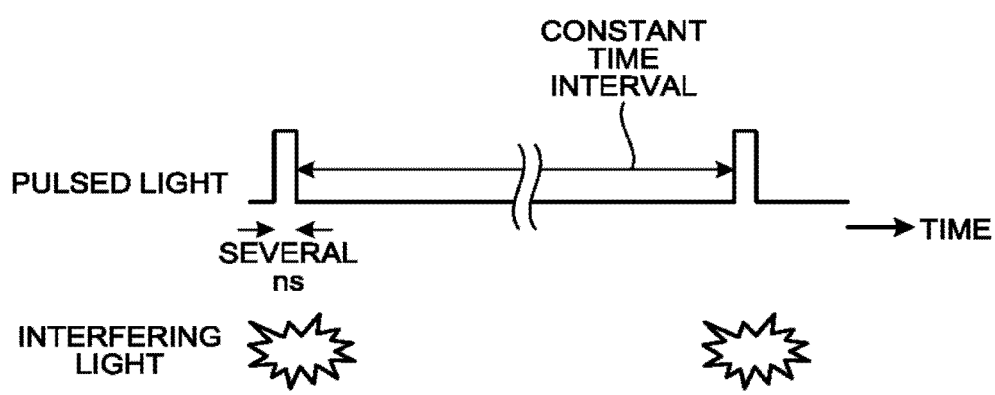
FIG. 9B is an explanatory diagram of emission timing of pulsed light and interfering light in the distance measurement apparatus according to comparative example.

FIG. 9B is an explanatory diagram of emission timing of pulsed light and interfering light in the distance measurement apparatus according to the comparative example. It is assumed that the light emitter of the distance measurement apparatus according to the comparative example emits pulsed light (for example, a pulse width of several nanoseconds) in certain cycle (certain time interval) and interfering light is also emitted in the same cycle.

Figure 9C:
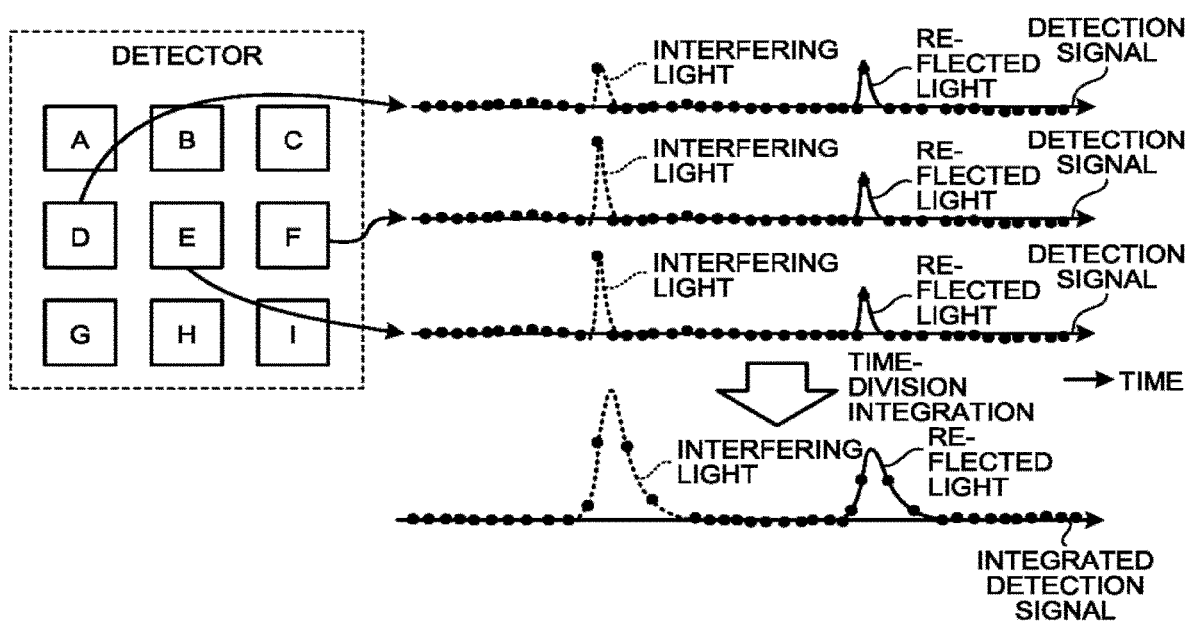
FIG. 9C is an explanatory diagram of time-division integration in the distance measurement apparatus according to Comparative Example.

FIG. 9C is an explanatory diagram of time-division integration in the distance measurement apparatus according to the comparative example. The detector includes light receiving elements A to T. In FIG. 9C, the light receiving elements are arranged in three-by-three, but the vertical and horizontal numbers of light receiving elements are merely exemplary and are not limited thereto.

Herein, the direction of D to F corresponds to the scanning direction of the pulsed light, and the light receiving elements D, E, and F detect the reflected light of each pulsed light in order. In this case, the interfering light wave and the reflected light wave appear at the same timing with reference to a detection start timing of each of the detection signals (hereinafter, also referred to as detection signals D, E, and F)

of the light receiving elements D, E, and F. In FIG. 9C, the horizontal axis represents time, and the vertical axis represents luminance of the detection signals.

The detection signals D, F, and F are time-divisionally integrated to generate an integrated detection signal, which results in amplifying both the interfering light wave and the reflected light wave. Herein, the time-division integration refers to integrating multiple detection signals after aligning the time axes with a certain reference (for example, detection start timing). For example, the detection signals D, E, and F may be interpolated by adding the detection signals A and G, B and H, and C and I, respectively. Alternatively, for example, the detection signals A, B, C, D, F, G, H, and I may be added to the detection signal E for interpolation. By such interpolation, a signal-to-noise (S/N) ratio of the detection signals can be improved.

In the distance measurement apparatus according to the comparative example, the meter (not illustrated) determines presence of an object when the integrated detection signal exhibits a luminance equal to or higher than a certain threshold value, and measures the distance to the object from a length of time from a light emission to a return of the reflected light. As illustrated in FIG. 9C, thus, by high-luminance interfering light indicated by the integrated detection signal, the meter determines presence of the object. This results in an incorrect distance measurement.

In the distance measurement using radio waves such as millimeter waves, the radio waves are varied in frequency to deal with interfering light, by way of example. However, LIDAR uses pulsed light having a pulse width of, for example, several ns (nano seconds) so that varying the frequency of light is difficult.

First Embodiment

Figure 1:
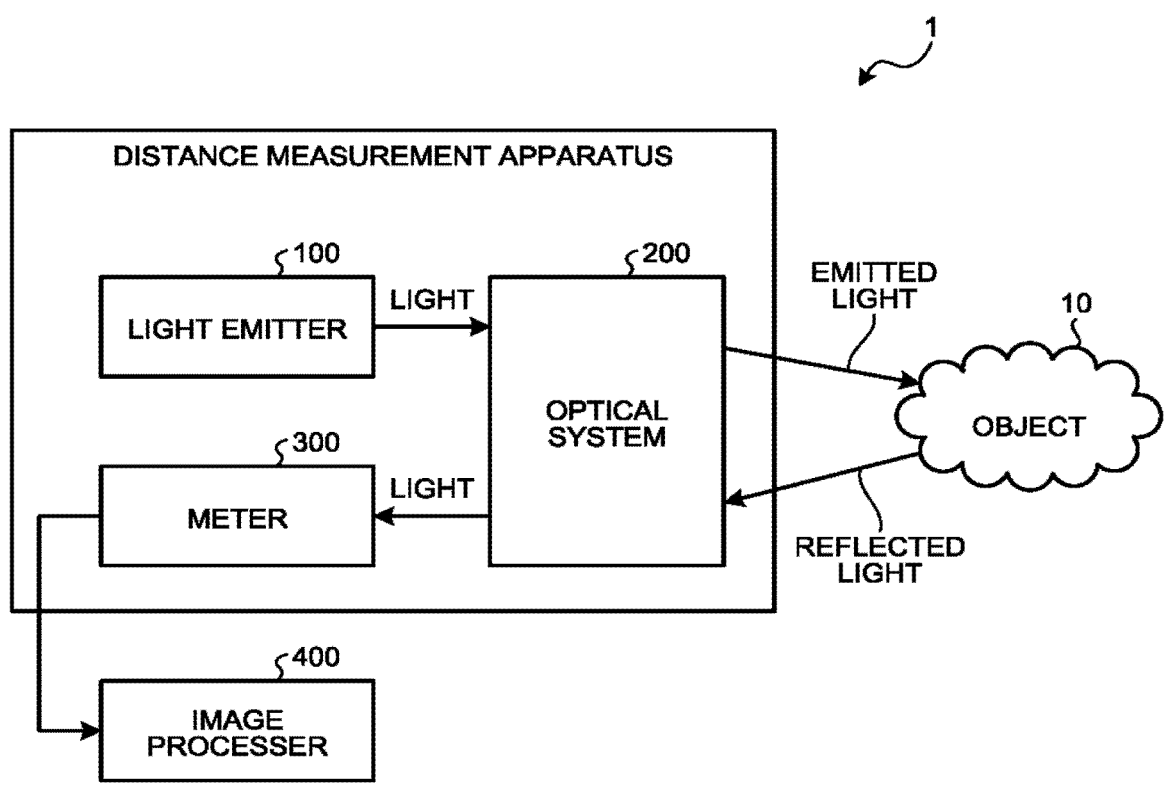
FIG. 1 is a schematic overall configuration diagram of a distance measurement apparatus according to a first embodiment.

First, a first embodiment will be described. FIG. 1 is a schematic overall configuration diagram of a distance measurement apparatus 1 according to the first embodiment. The distance measurement apparatus 1 measures a distance from a difference in timing between a light emission and detection of a return of reflected light (scattered light) by the object 10. The distance measurement apparatus 1 includes a light emitter 100, an optical system 200, a meter 300, and an image processer 400.

The light emitter 100 emits pulsed light having a certain pulse width. For example, the light emitter 100 includes a light source that emits a laser beam, and intermittently emits pulsed light.

The optical system 200 directs the pulsed light emitted from the light emitter 100 to the object 10 and receives the pulsed light reflected by the object 10. More specifically, the optical system 200 scans the object 10 with the pulsed light (emitted light) emitted from the light emitter 100 and allows the reflected pulsed light by the object 10 to be incident on the meter 300.

The meter 300 measures the distance from the distance measurement apparatus 1 to the object 10 from a length of time from the light emission from the light emitter 100 to the return of the reflected light by the object 10. More specifically, the meter 300 processes the reflected light in accordance with a detection signal having an intensity corresponding to the intensity of the reflected light received through the optical system 200 (described in detail later).

The image processer 400 performs noise removal, distortion correction, and interpolation, and outputs distance image data. The image processer 400 may be incorporated in a housing of the distance measurement apparatus 1.

FIG. 2 is an overall configuration diagram of the distance measurement apparatus 1 according to the first embodiment. The distance measurement apparatus 1 generates an image of the distance to the object 10 by scanning and time-of-flight (TOF) method. That is, the distance measurement apparatus 1 intermittently emits light L1 to the object 10 and measures the distance from the distance measurement apparatus 1 to the object 10 based on a length of time from the emission of the light L1 to a return of light L2 reflected by the object 10.

The light emitter 100 includes a light source 102, an oscillator 104, driving circuits 106 and 108, and a scan controller (optical scanner controller) 110.

The optical system 200 includes a lens 202, optical elements 204 and 206, and a reflecting device (reflecting mirror) 208.

The meter 300 includes photodetectors 302 and 304, a lens 306, an amplifier 308, an analog circuit 310, and a digital circuit 312.

As described later, the reflecting device 208 is a component for scanning light. Existing optical scanning methods includes rotating the light source 102, the lens 202, the photodetectors 302 and 304, and the lens 306 (hereinafter, referred to as a rotation method) in addition to using the reflecting device 208. Another existing scanning method is an optical phased array method (hereinafter, referred to as an CPA method). The first embodiment does not depend on the optical scanning method, and can also adopt the reflecting device 208, the rotation method, and the CPA method.

The oscillator 104 of the light emitter 100 generates a pulse signal. The driving circuit 106 drives the light source 102 by the pulse signal. The light source 102 is, for example, a laser light source such as a laser diode to intermittently emit the light L1, driven by the driving circuit 106. That is, the light L1 is pulsed light.

The scan controller 110 controls the reflecting device 208 to continuously change a tilt angle of a reflecting surface 208a. The driving circuit 108 drives the reflecting device 208 according to a driving signal supplied from the scan controller 110.

The lens 202, the optical element 204, the optical element 206, and the reflecting device 208 of the optical system 200 are disposed in this order on the optical path of the light L1 from the light source 102. The lens 202 collimates the light L1 and guides the collimated light to the optical element 204.

The optical element 204 is provided between the lens 202 and the optical element 206. The optical element 204 transmits the light L1 and allows a part of the light L1 to be incident on the photodetector 302. The optical element 204 may be, for example, a splitter.

The optical element 206 transmits the light L1 having transmitted through the optical element 204 and allows the light L1 to be incident on the reflecting device 208.

The reflecting device 208 includes the reflecting surface (mirror surface) 208a that reflects the light L1 emitted from the light source 102. The reflecting device 208, when driven, continuously changes the tilt angle of the reflecting surface 208a to continuously change the traveling direction of the light L1 for scanning the object 10. In addition, the reflecting surface 208a reflects the light L2 reflected by the object 10. The reflecting device 208 having the reflecting surface 208a is, for example, rotatable around two mutually crossing rotation axes RA1 and RA2.

The reflecting surface 208a horizontally scans the light L1 in sequence along substantially parallel linear paths on the object 10 while vertically shifting the light L1. That is, a linear path P1 of the light L1 scans the object 10 in X direction (horizontal direction) and then a Y-directionally (vertically) shifted linear path P2 scans the object 10 in the X direction. By such repeated scanning, the object 10 is irradiated with each linear path of pulsed light. The number of linear paths and the scanning direction are not particularly limited.

The irradiated light L1 is reflected (scattered) by the object 10. The light L1 reflected by the object 10 (hereinafter, referred to as reflected light L2) travels in the opposite direction along substantially the same optical paths as the optical path of the light L1. The reflected light L2 is a photon. The reflected light L2 by the reflecting surface 208a is incident on the optical element 206.

In FIG. 2, the optical path of the light L1 and that of the reflected light L2 are separately illustrated for the sake of improved visibility, however, in reality these optical paths substantially coincide with each other. In addition, FIG. 2 illustrates the central optical path of the flux of the light. L1 and the central optical path of the flux of the reflected light L2 to be incident on the reflecting surface 208a. Reflected light L3 travels in a different direction from the reflected light L2 and is not incident on the reflecting surface 208a.

The optical element 206 changes the traveling direction of the reflected light L2 by the reflecting surface 208a, and the lens 306 of the meter 300 collects and allows the reflected light L2 to be incident on the photodetector 304. The optical element 206 may be, for example, a half mirror or a mirror with a hole.

The photodetector 304 detects the reflected light L2 incident from the lens 306. The analog circuit 310 is, for example, an amplifier, and amplifies the output signal of the photodetector 304 and performs bandpass filtering.

The photodetector 302 detects the light L1 incident from the optical element 204. The amplifier 308 amplifies the output signal of the photodetector 302 and performs bandpass filtering.

The digital circuit 312 receives output signals from the amplifier 308 and the analog circuit 310, and measures the distance from the distance measurement apparatus 1 to the object 10 from results (output signals) of the detection by the photodetectors 302 and 304. Specifically, the digital circuit 312 measures the distance from the distance measurement apparatus 1 to the object 10 from difference in timing between the detection of the light L1 by the photodetector 302 and the detection of the reflected light L2 by the photodetector 304. That is, the longer the time difference is, the longer the calculated distance is.

Figure 3A:
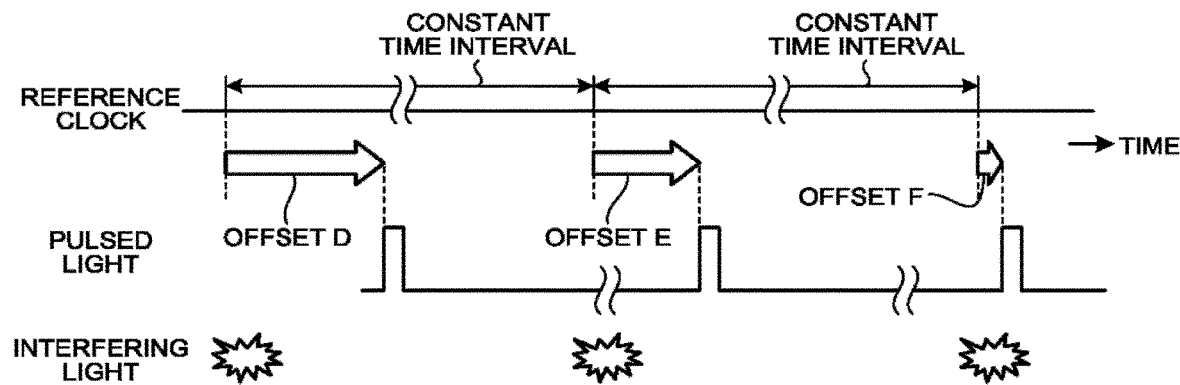
FIG. 3A is an explanatory diagram of light emission timing in the first embodiment.

Next, operations of the distance measurement apparatus 1 will be described with reference to FIGS. 3A and 3B. FIG. 3A is an explanatory diagram of light emission timing in the first embodiment. The light emitter 100 emits the light beam in a certain cycle with delay corresponding to a randomly set offset time. That is, as illustrated in FIG. 3A, the light emitter 100 emits the pulsed light in a certain cycle (constant interval) of a reference clock with delay corresponding to a randomly set offset time (offsets D, E, and F). The lengths of the offsets D, E, and F may be determined by, for example, a random number. It is assumed that the interfering light is emitted in the certain cycle.

Figure 3B:
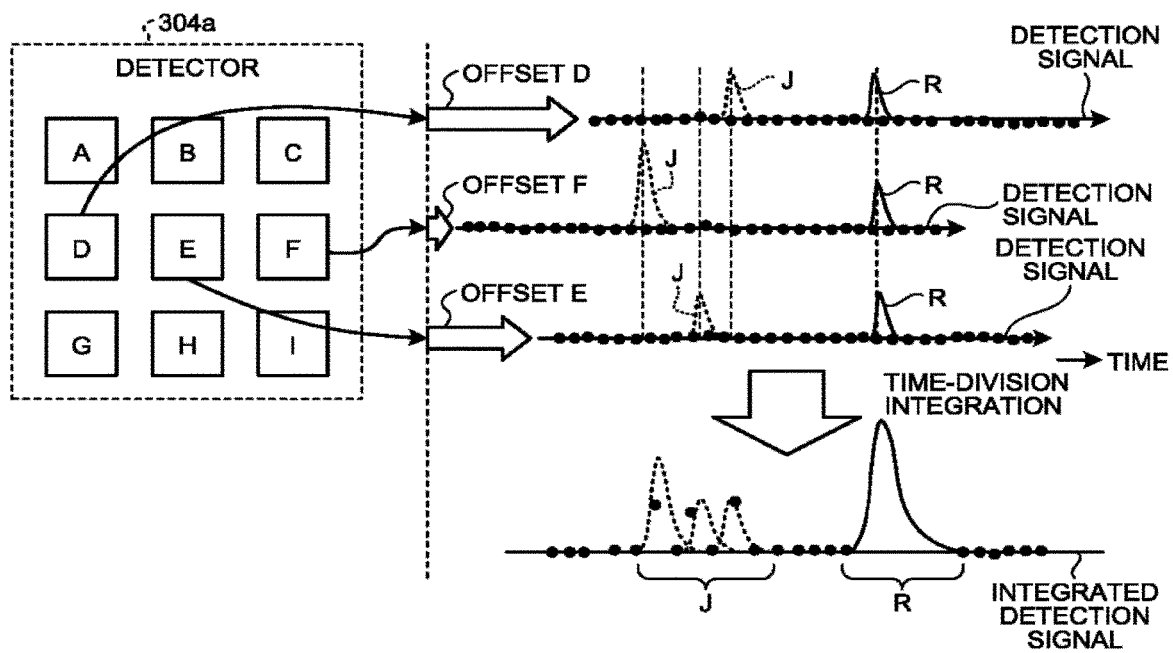
FIG. 3B is an explanatory diagram of time-division integration in the first embodiment.

FIG. 3B is an explanatory diagram time-division integration in the first embodiment. The detector 304a (photodetector 304) illustrated in FIG. 3B includes light receiving elements A to I. In FIG. 3B, the light receiving elements are arranged in three-by-three, however, the vertical and horizontal numbers of the light receiving elements are merely exemplary and are not limited thereto.

In the drawings, the direction D to F corresponds to the scanning direction of the pulsed light, and the light receiving elements D, F, and F detect the reflected light of the pulsed light in order. In this case, when the photodetector 304 starts detection of the detection signals D, E, and F in the certain cycle with delays corresponding to the offsets D, E, and F, detection timings of the interfering light wave (reference code J) do not match, whereas the detection timings of the reflected light wave (reference code R) match. In FIG. 3B, the horizontal axis represents time, and the vertical axis represents luminance of the detection signals.

The meter 300 generates an integrated detection signal (first integrated detection signal) by shifting detection signals of the light beam emitted in the certain cycle by the respective offsets and time-divisionally integrating the detection signals, and determines based on the integrated detection signal whether or not the light indicated by the detection signals is reflected light by the object 10, emitted from the light emitter 100. Specifically, as a result of the meter 300's generating the integrated detection signal by time-divisionally integrating the detection signals D, E, and F as described above, the interfering light wave is not amplified, whereas the reflected light wave is amplified. For example, the detection signals D, E, and F may be interpolated by adding thereto the detection signals A and G, B and H, and C and I, respectively. Alternatively, the detection signal E may be interpolated by, for example, adding the detection signals A, B, C, D, F, G, H, and I. Such interpolation can improve S/N ratio.

When the integrated detection signal exhibits a luminance equal to or higher than a certain threshold value, the meter 300 determines presence of the object 10 and measures the distance to the object 10 from a length of time from the emission of the light beam to a return of the reflected light. Thus, as illustrated in FIG. 3B, the integrated detection signal indicates normally reflected light with higher luminance, so that appropriately setting the threshold value enables improvement in accuracy at which the object 10 is detected not by the interfering light but by normally reflected light. That is, it is possible to provide the distance measurement apparatus 1 capable of accurately determining whether detected light is normally reflected light or interfering light.

Conventionally, for example, vehicles such as passenger vehicles use a distance measurement apparatus to detect other vehicles and pedestrians. If a malicious third party emits interfering light with a laser generator, the distance measurement apparatus may erroneously identify the interfering light as another vehicle or a pedestrian nearby, and enforcedly stop the vehicle. The distance measurement apparatus 1 according to the first embodiment can reduce occurrence of such a situation.

Second Embodiment

Next, operations of a distance measurement apparatus 1 according to a second embodiment will be described with reference to FIGS. 4A and 4B. In the second and subsequent embodiments, redundant descriptions of the previous embodiments will be appropriately omitted.

Figure 4A:
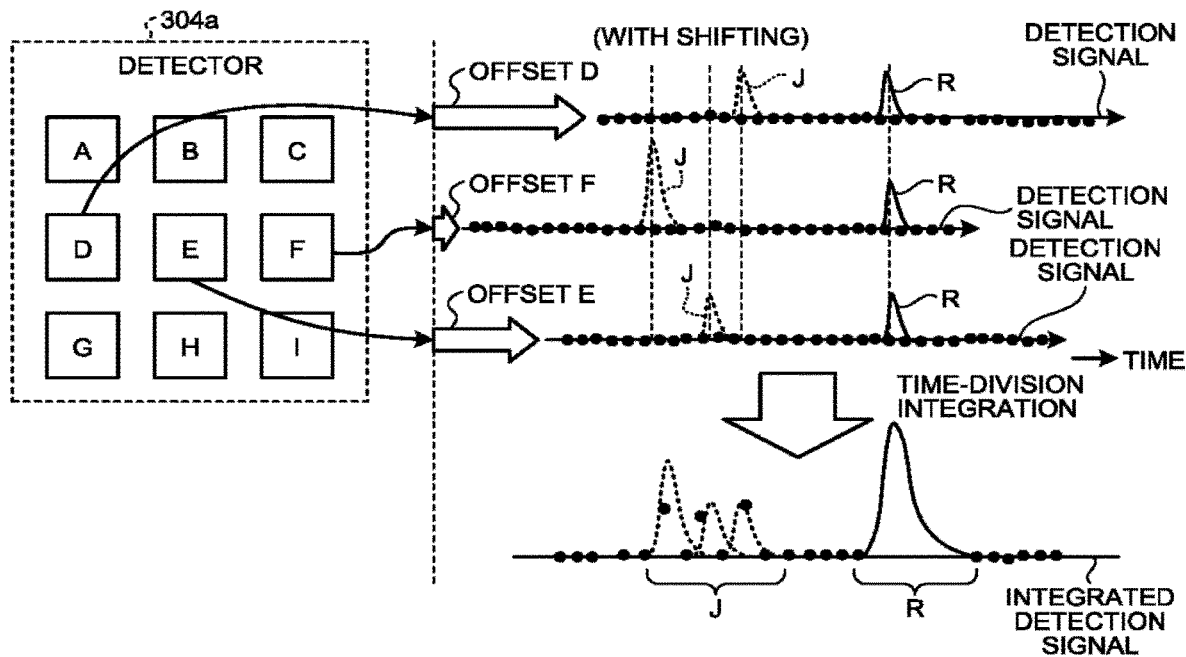
FIG. 4A is an explanatory diagram of shifted time-division integration in a second embodiment.

FIG. 4A is an explanatory diagram of shifted time-division integration in the second embodiment. Operations in FIG. 4A are the same as the operations in FIG. 3B, and thus, the description thereof will be omitted.

Figure 4B:
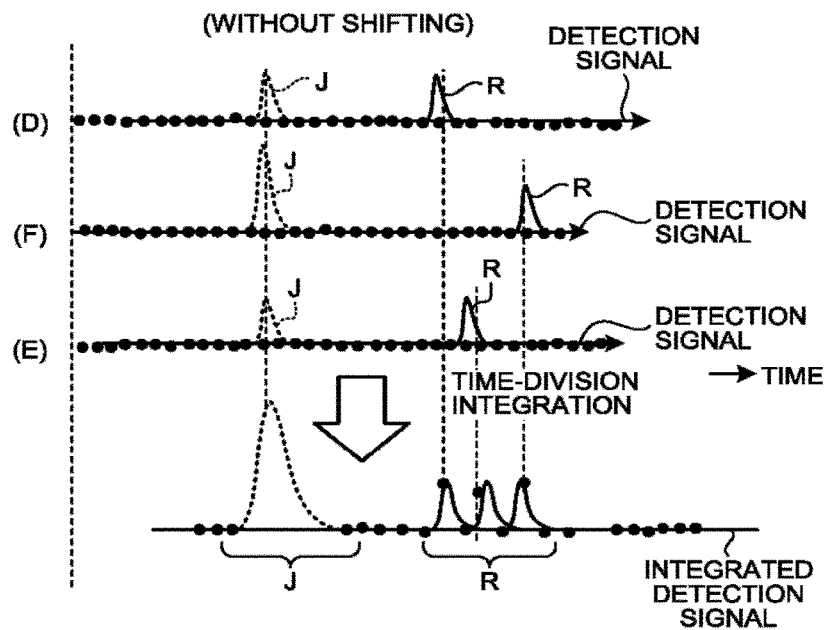
FIG. 4B is an explanatory diagram of non-shifted time-division integration in the second embodiment.

FIG. 4B is an explanatory diagram of non-shifted time-division integration in the second embodiment. In FIG. 42, when the photodetector 304 starts detecting each of the detection signals D, E, and F in the certain cycle without delays corresponding to the offsets D, E, and F (that is, irrespective of the offsets D, E, and F), the detection timings of the interfering light wave (reference code J) match, whereas the detection timings of the reflected light wave (reference code R) do not match.

The meter 300 generates a second integrated detection signal by time-divisionally integrating detection signals of the light beam emitted in the certain cycle without the shifting by the offsets, and determines, in accordance with the first integrated detection signal and the second integrated detection signal, whether or not the light indicated by the detection signals is reflected light by the object 10, emitted from the light emitter 100. More specifically, the meter 300 generates the second integrated detection signal by time-divisionally integrating the detection signals D, E, and F irrespective of the offsets D, E, and F. As a result, the interfering light wave is amplified, whereas the reflected light wave is not amplified. The detection signals D, B, and F may be interpolated by adding the detection signals A and G, B and H, and C and I, respectively.

In addition, the meter 300 determines whether or not the light indicated by the detection signals is reflected light by the object 10, emitted from the light emitter 100 by comparing the first integrated detection signal in FIG. 4A and the second integrated detection signal in FIG. 4B. That is, the meter 300 determines that the non-amplified wave of the first integrated detection signal in FIG. 4A and the amplified wave of the second integrated detection signal in FIG. 4B are interfering light waves, and the meter 300 determines that the amplified wave of the first integrated detection signal in FIG. 4A and the non-amplified wave of the second integrated detection signal in FIG. 4B are normally reflected light waves.

In general, it is likely that normally reflected light by the object 10 is weakened due to reflection (scattering), while interfering light is intense because of direct emission from the light emitting device to the distance measurement apparatus 1. In such a case, the distance measurement apparatus 1 according to the second embodiment can accurately distinguish between the interfering light and the normally reflected light.

Figure 5:
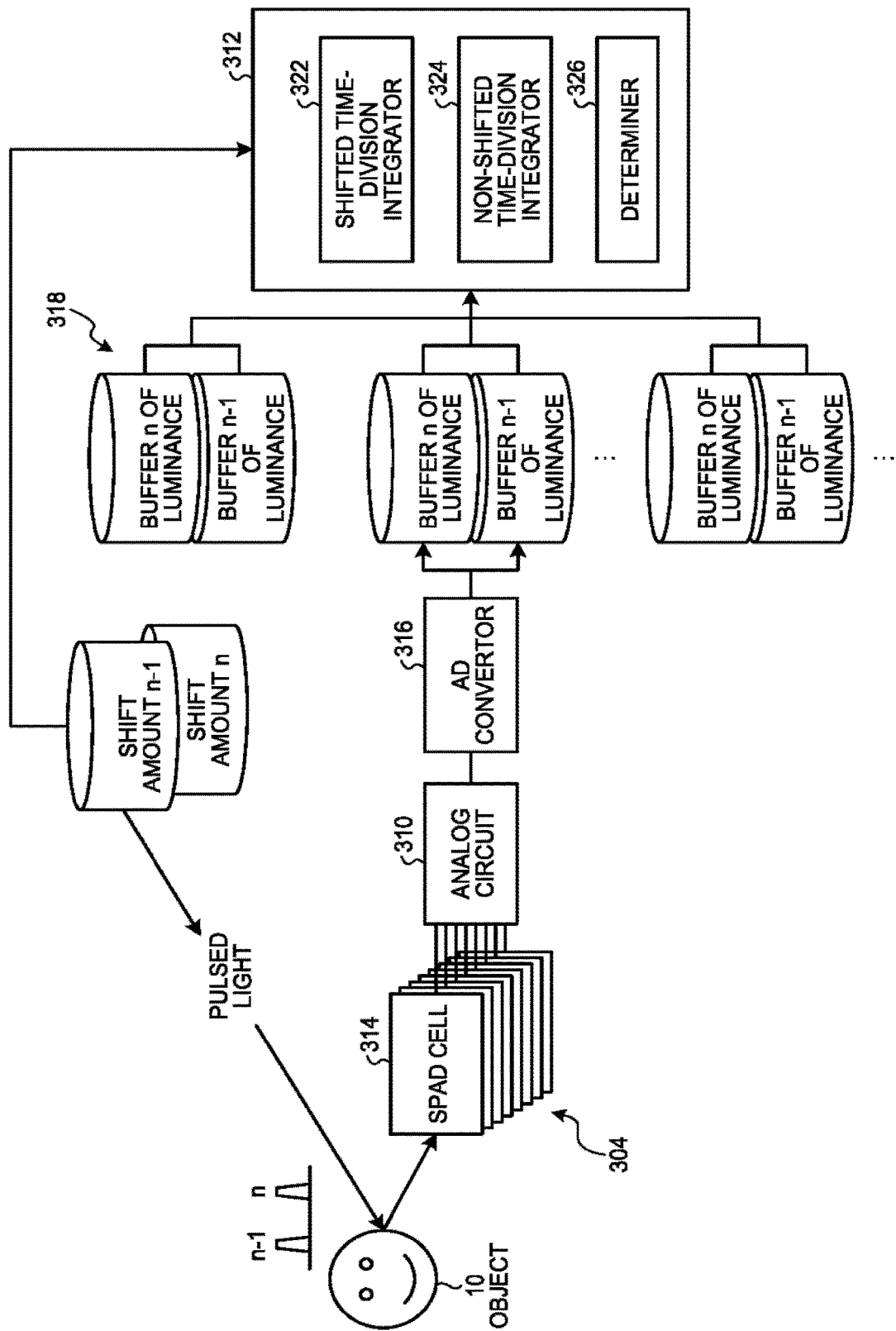
FIG. 5 is a schematic overall configuration diagram of a distance measurement apparatus according to the second embodiment.

Next, implementation means for the distance measurement apparatus 1 according to the second embodiment will be described with reference to FIG. 5. FIG. 5 is a schematic overall configuration diagram of the distance measurement apparatus 1 according to the second embodiment. In FIG. 5 the light emitter 100 and the optical system 200 are omitted for simplification.

The photodetector 304 outputs an output signal according to the intensity of the light received through the optical system 200. The photodetector 304 includes a plurality of single-photon avalanche diode (SPAD) cells 314 as an example of the light receiving elements. The SPAD cells 314 include SPADs and electrical elements (for example, resistors, capacitors, and semiconductors) connected to the SPADs. In place of SPADs, avalanche photodiodes (APDs) and photodiodes (PDs) can also be used.

The SPAD cells 314 use, for example, an avalanche photodiode (APD) in Geiger mode. The SPAD cells 314 can attain a 10,000 or more times larger gain by Geiger discharge. That is, each of the SPAD cells 314 outputs an output signal in accordance with the intensity of the light received through the optical system 200.

The analog circuit 310 amplifies the output of each of the SPAD cells 314 of the photodetector 304. The analog circuit 310 includes, for example, an analog front end.

Upon emission of the pulsed light from the light emitter 100, an AD convertor 316 (analog-to-digital converter (ADC)) in the meter 300 samples, at multiple sampling timings, signals corresponding to the amplified output signals of the SPAD cells 314 by the analog circuit 310, and converts the output signals into respective digital detection signals.

The meter 300 also includes a plurality of buffers 318 corresponding to the SPAD cells 314. Each the buffers 318 can retain the digital detection signals before time-division integration. To time-divisionally integrate the same data twice (FIG. 4A and FIG. 4B), the digital detection signals need to be stored in the buffers. The meter 300 also includes a buffer that retains a shift amount (offset amount). That is, the buffers 318 are storage that stores light detection signals together with their respective offsets in the certain cycle.

The digital circuit 312 includes a shifted time-division integrator 322, a non-shifted time-division integrator 324, and a determiner 326.

Referring to the buffers 318, the shifted time-division integrator 322 generates a first integrated detection signal by shifting detection signals of the light beam emitted in the certain cycle by the respective offsets (FIG. 4A) and time-divisionally integrating the detection signals.

Referring to the buffers 318, the non-shifted time-division integrator 324 generates a second integrated detection signal by time-divisionally integrating detection signals of the light beam emitted in the certain cycle without the shifting by the offsets (FIG. 4B).

Based on the first integrated detection signal and the second integrated detection signal, the determiner 326 determines whether or not the light indicated by the detection signals is reflected light by the object 10, emitted from the light emitter 100.

In this manner, it is possible to attain the distance measurement apparatus 1 capable of accurately distinguishing between the interfering light and the normally reflected light.

Third Embodiment

Figure 6:
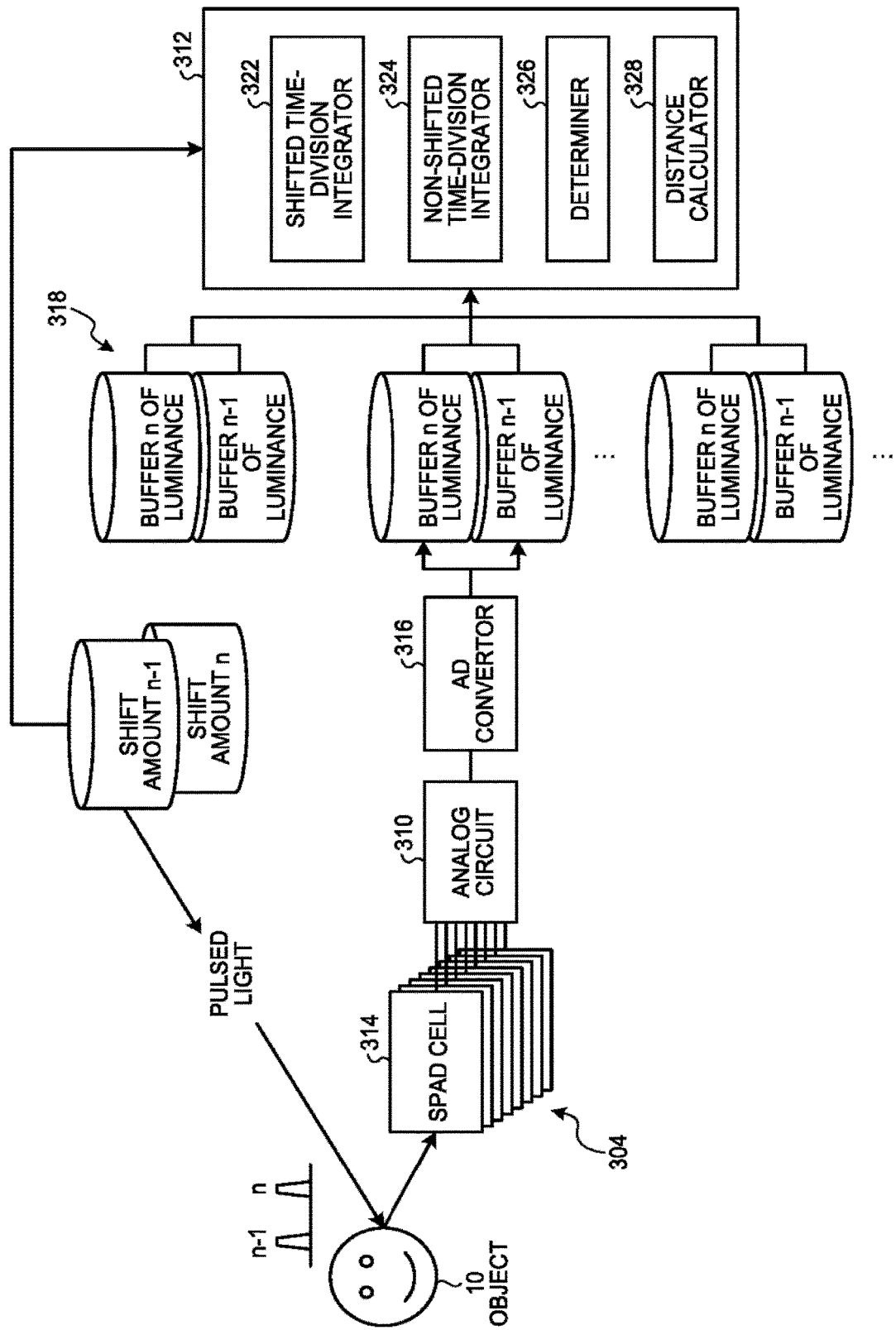
FIG. 6 is a schematic overall configuration diagram of a distance measurement apparatus according to a third embodiment.

Next, a third embodiment will be described. FIG. 6 is a schematic overall configuration diagram of a distance measurement apparatus 1 according to the third embodiment. The third embodiment is different from the second embodiment in measuring (calculating), after distinguishing between the interfering light and the normally reflected light, the distance without the time-division integration, on the basis of the vicinity of the peak of the detection signal of the normally reflected light. Differences from the second embodiment will be described below.

The digital circuit 312 further includes a distance calculator 320. When the determiner 326 determines based on the first integrated detection signal and the second integrated detection signal that the light indicated by the detection signals is reflected light by the object 10, emitted from the light emitter 100, the distance calculator 326 measures the distance to the object 10 on the basis of the vicinity of the peak of the detection signal of the reflected light.

In this manner, the distance measurement apparatus 1 according to the third embodiment can accurately measure distance through simple processing on the basis of the vicinity of the peak of the detection signal of the normally reflected light, after distinguishing between the interfering light and the normally reflected light.

Fourth Embodiment

Next, a fourth embodiment will be described. FIG. 7 is a schematic overall configuration diagram of a distance measurement apparatus 1 according to the fourth embodiment. The fourth embodiment is different from the first to third embodiments in that the digital circuit 312 further includes a second shifted time-division integrator 330 and a peak calculator 332 and that the meter 300 further includes a ID convertor 334 (time-to-digital converter (TEC)), an interfering-light detector 336, and a processor 338. Differences from the first to third embodiments will be described below.

The second shifted time-division integrator 330 time-divisionally integrates a digital detection signal, which corresponds to an output of the central SPAD cell 314 (for example, represented by E in the detector 304a of FIG. 7) among the SPAD cells 314 of the photodetector 304, and digital detection signals, which correspond to outputs of the SPAD cells 314 (for example, represented by B and H in the detector 304a of FIG. 7) located within a certain area from the central SPAD cell 314 (E), with the above-described offsets, to output an integrated digital detection signal. In the integration, the integrated value may be or may not be divided by the number of integrations.

The peak calculator 332 calculates the peak of a detection signal wave of the normally reflected light determined by the determiner 326. The distance calculator 328 measures the distance to the object 10 on the basis of the vicinity of the peak of the detection signal of the normally reflected light.

The AD convertor 316 and the ID convertor 334 receive sensor outputs from the same or adjacent light receiving elements SPAD cells 314). On the basis of the sensor outputs, the TD convertor 334 measures a difference in time from the emission of the pulsed light to the detection of the reflected light by the object 10 to output time difference information. In general, the TD convertor 334 exerts higher temporal resolution than the AD convertor 316. Using the time difference information output from the TD convertor 334, the distance measurement apparatus 1 can implement more accurate processing.

The interfering light detector 336 detects the interfering light on the basis of the time difference information received from the TD convertor 334. The interfering light detector 336 implements, as software, the same or similar processing as that by the digital circuit 312 as hardware. For example, upon light emission, the interfering light detector (meter) 336 measures the distance and compares a result of the distance measurement concerned with results of the distance measurement by the emissions before and after the corresponding emission, to determine whether or not the light is reflected light by the object 10, emitted from the light emitter 100.

The processor 338 performs arithmetic processing on the basis of both a result of the processing by the digital circuit 312 and a result of the processing by the interfering light detector 336. For example, the processor 338 combines the determination (second determination) by the digital circuit 312 and the determination (first determination) by the interfering light detector 336 to determine whether or not the light is normally reflected light. Specifically, for example, the processor 338 determines presence of interfering light when one of the digital circuit 312 and the interfering light detector 336 detects the interfering light. However, the embodiment is not limited thereto. For example, the processor 338 may determine presence of the interfering light only when both of the digital circuit 312 and the interfering light detector 336 detect the interfering light.

Thus, the distance measurement apparatus 1 according to the fourth embodiment can more accurately distinguish between the interfering light and the normally reflected light through the processing of the data from the AD convertor 316 and the data from the TD convertor 334. Further, the TD convertor 334 and interfering light detector 336 are software, so that the addition thereof does not cause substantial cost increase.

Fifth Embodiment

Next, a fifth embodiment will be described. FIG. 8 is an explanatory diagram of light emission timing in a fifth embodiment. The fifth embodiment is different from the first to fourth embodiments in that pulsed light is emitted two or more times for one distance measurement. Hereinafter, differences from the first to fourth embodiments will be described. The distance measurement apparatus 1 of the fifth embodiment does not differ in configuration from those in FIG. 1 and FIG. 2.

The light emitter 100 intermittently emits multiple light beams for one distance measurement. The meter 300 determines whether or not the light indicated by the detection signals is reflected light by the object 10, emitted from the light emitter 100, on the basis of the correlation between the detection signal of the light and an estimated signal from the intermittently emitted light beams.

The light emitter 100 determines, based on a random number, the time intervals at which the light beams are intermittently emitted for one distance measurement, for example. In addition, the light emitter 100 determines the time intervals between the intermittently emitted light beams for one distance measurement by selecting, based on a random number, one from among sets of time intervals prepared in advance, for example.

Specifically, as illustrated in FIG. 8, the light emitter 100 emits pulsed light three times as a pulsed light group P11 for one distance measurement. The time intervals among the three pulsed-light emissions are time i11 and time i12, for example.

The light emitter 100 emits pulsed light three times as a pulsed light group P12 for one distance measurement. The time intervals among the three pulsed-light emissions are time i21 and time i22.

The time i11 and the time i12 may be determined based on a random number or may be determined by selecting, based on a random number, one of pairs of time intervals prepared in advance, for example. The same applies to the time i21 and the time i22.

The meter 300 determines, based on the correlation between a detection signal R1 and an estimated signal H1 from the pulsed light group P11, whether or not the light indicated by the detection signal R1 is reflected light by the object 10, emitted from the light emitter 100, for example. The same applies to a detection signal R2 and an estimated signal H2 and to a detection signal J and an estimated signal H3. The meter 300 determines the detection signal J to be the interfering light since among the three pairs, only the detection signal J and the estimated signal H3 exhibit is a low correlation.

In this manner, the distance measurement apparatus 1 according to the fifth embodiment intermittently emits multiple light beams for one distance measurement, and determines whether the light is normally reflected light or interfering light on the basis of the correlation between the detection signal and the estimated signal. Thereby, the distance measurement apparatus 1 can improve S/N ratio and requires less buffer capacity.

The number of pulsed-light emissions as the pulsed light group is not limited to three, and may be set to two or four or more.

Sixth Embodiment

Figure 10A:
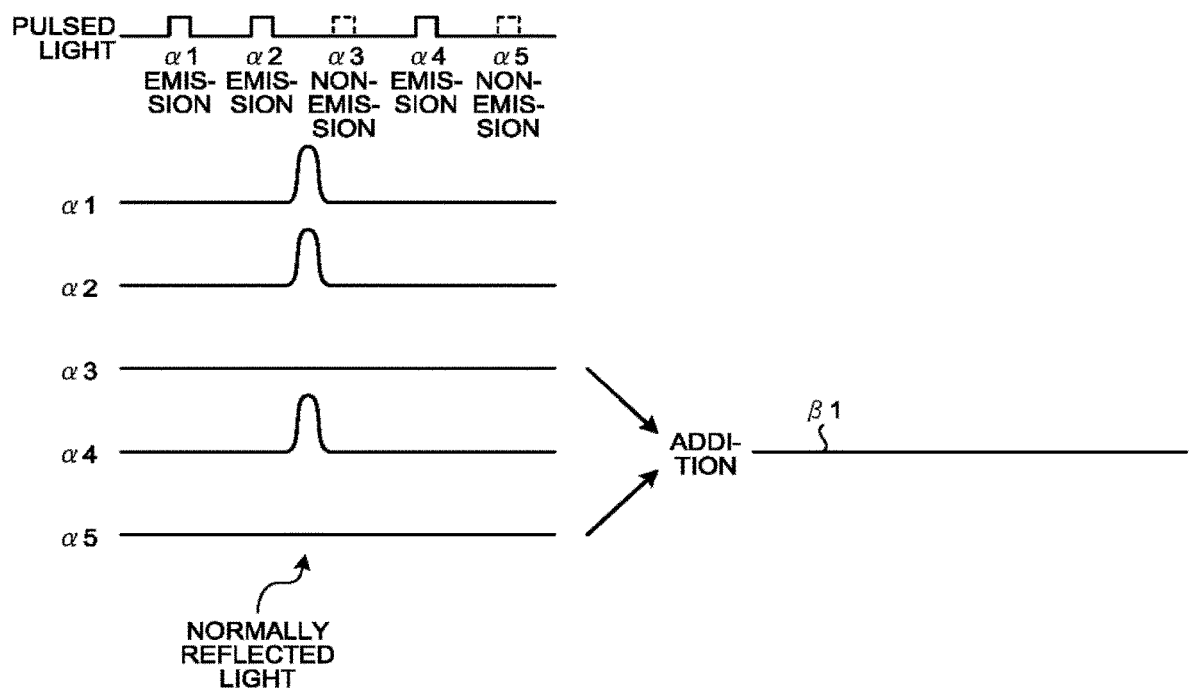
FIG. 10A is an explanatory diagram illustrating light detection signals at a certain time interval at the time of pulsed-light emission and non-emission, and absence of interfering light in a sixth embodiment.
Figure 10B:
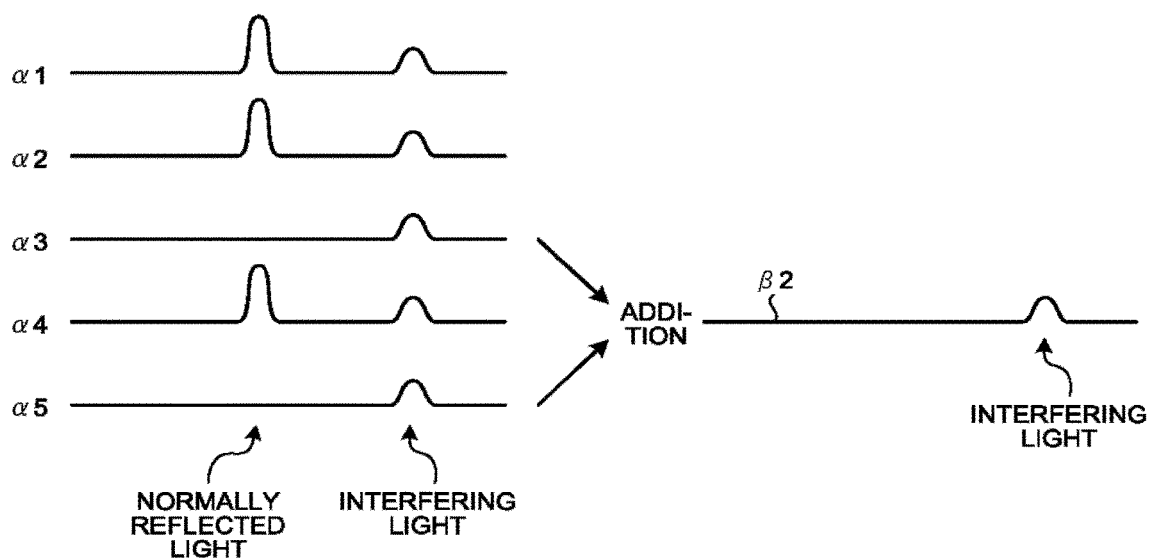
FIG. 10B is an explanatory diagram illustrating light detection signals at certain time interval with no interfering light in the sixth embodiment.

Next, a sixth embodiment will be described. FIG. 10A is an explanatory diagram illustrating light detection signals at a certain time interval when pulsed light is emitted, and not emitted, and when interfering light is present in the sixth embodiment. FIG. 10B is an explanatory diagram illustrating light detection signals at a certain time interval when interfering light is present in the sixth embodiment.

The sixth embodiment is different from the first to fifth embodiments in that the light emitter 100 (FIGS. 1 and 2) stops emitting the light beam at a certain time interval (in a certain cycle). Hereinafter, differences from the first to fifth embodiments will be described. The distance measurement apparatus 1 does not differ in configuration from those illustrated in FIG. 1 and FIG. 2.

As described above, the light emitter 100 stops emitting the light beam at a certain time interval. Specifically, the light emitter 100 stops emitting the light beam at a certain time interval with random probability, for example. In this case, as illustrated in FIG. 10A, among the timings $\alpha 1$ to $\alpha 5$ in the certain time interval the pulsed light is emitted at the timings $\alpha 1$, $\alpha 2$, and $\alpha 4$ while the pulsed light is not emitted at the timings $\alpha 3$ and $\alpha 5$, for example.

The meter 300 (FIG. 1 and FIG. 2) generates an integrated detection signal of the detection signals of the light in the time intervals in which the light emitter 100 does not emit the light beam. Upon detection of the light by the integrated detection signal, the meter 300 determines that the light is interfering light. For example, as illustrated in FIG. 10A, the meter 300 generates an integrated detection sign (reference code $\beta 1$) by integrating (adding) the detection signals of the light in the time intervals $\alpha 3$ and $\alpha 5$ in which the light emitter 100 does not emit the light beam. When not detecting the light by the integrated detection signal (reference code $\beta 11$), the meter determines absence of interfering light.

With presence of interfering light, for example, as illustrated in FIG. 10B, the meter 300 generates an integrated detection signal (reference code $\beta 21$ by integrating (adding) the detection signals of the light in the time interval $\alpha 3$ and $\alpha 5$ in which the light emitter 100 does not emit the light beam. When detecting the light by the integrated detection signal (reference code ($\beta 21$, the meter 300 determines presence of interfering light.

In this manner, the distance measurement apparatus 1 according to the sixth embodiment can detect the interfering light even when the detection signal of the interfering light is at lower level than the detection signal of the normally reflected light. That is, it can detect the interfering light accurately (with high sensitivity).

While several embodiments the invention have been described above, the above-described embodiments have been presented by way of examples only, and the embodiments are not intended to limit the scope of the invention. These novel embodiments described herein may be embodied in a variety of other forms; furthermore, various omissions, substitutions, and changes in the form of the embodiments described herein may be made within the scope without departing from the spirit of the invention. These embodiments and modifications thereof are included in the cope and spirit of the invention and fall within the scope of the invention described in the claims and the equivalents thereof.

A program executed by the distance measurement apparatus 1 according to the embodiments may be recorded and provided in an installable or executable file format on a computer-readable recording medium, such as a compact disc read only memory (CD-ROM), a flexible disk (CD), a CD-R recordable), or a digital versatile disk (DVD). The program executed by the distance measurement apparatus 1 according to the embodiments may be provided or distributed via a network such as the Internet.

What is claimed is:

1. A distance measurement apparatus comprising:
   a light emitter that intermittently emits a light beam in a certain cycle with delay corresponding to a randomly set offset time; and
   a meter that generates an integrated detection signal by shifting a digital detection signal of the emitted light beam and a digital detection signal of a light beam emitted immediately previous to the emitted light beam by the respective offset times and time-divisionally integrating the time-series digital detection signals, and measures a distance to an object in accordance with the integrated detection signal and a length of time from an emission of the light beam from the light emitter to a return of reflected light by the object.

2. A distance measurement apparatus comprising:
   a light emitter that intermittently emits a light beam in a certain cycle with delay corresponding to a randomly set offset time; and
   a meter that generates an integrated detection signal by shifting a plurality of detection signals of the light beam emitted in the certain cycle by the respective offset times and time-divisionally integrating the detection signals, and measures a distance to an object in accordance with the integrated detection signal and a length of time from an emission of the light beam from the light emitter to a return of reflected light by the object, wherein the meter:
   generates a first integrated detection signal by shifting the detection signals of the light beam emitted in the certain cycle by the respective offset times and time-divisionally integrating the detection signals,
   generates a second integrated detection signal by time-divisionally integrating the detection signals without the shifting by the respective offset times, and
   measures the distance to the object in accordance with the first integrated detection signal and the second integrated detection signal.

3. The distance measurement apparatus according to claim 2, wherein the meter includes:
   a storage that stores the detection signals of the light beam emitted in the certain cycle together with the offset times; a shifted time-division integrator that, referring to the storage, generates a first integrated detection signal by shifting the detection signals of the light beam emitted in the certain cycle by the respective offset times and time-divisionally integrating the detection signals;
   a non-shifted time-division integrator that, referring to the storage, generates a second integrated detection signal by time-divisionally integrating the detection signals of the light beam emitted in the certain cycle without the shifting by the offset times; and
   a determiner that determines, based on the first integrated detection signal and the second integrated detection signal, whether or not the light indicated by the detection signals is reflected light by the object, emitted from the light emitter.

4. The distance measurement apparatus according to claim 2, wherein
upon determining based on the first integrated detection signal and the second integrated detection signal that the light indicated by the detection signals is reflected light by the object, emitted from the light emitter, the meter measures the distance to the object on the basis of one of the detection signals of the vicinity of a peak of the reflected light.

\* \* \* \* \*